United States Patent
Osame et al.

(10) Patent No.: US 7,355,338 B2
(45) Date of Patent: Apr. 8, 2008

(54) ELECTRONIC DEVICE PROVIDED WITH MULTIPLE DISPLAY PANELS INCLUDING AT LEAST ONE DUAL ELECTROLUMINESCENT LIGHT EMISSION PANEL

(75) Inventors: Mitsuaki Osame, Kanagawa (JP); Aya Anzai, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 277 days.

(21) Appl. No.: 10/736,789

(22) Filed: Dec. 17, 2003

(65) Prior Publication Data

US 2005/0040753 A1   Feb. 24, 2005

(30) Foreign Application Priority Data

Dec. 27, 2002 (JP) ............... 2002-378919

(51) Int. Cl.
*H05B 33/00* (2006.01)
*H01L 51/50* (2006.01)

(52) U.S. Cl. .............. 313/503; 313/512; 345/1.1; 345/1.3; 345/4

(58) Field of Classification Search ......... 313/500; 345/1.1–6
See application file for complete search history.

(56) References Cited

U.S. PATENT DOCUMENTS

| 6,297,945 | B1 * | 10/2001 | Yamamoto ............ 361/681 |
| 6,583,770 | B1 * | 6/2003 | Antila et al. ............ 345/1.1 |
| 2002/0063518 | A1 | 5/2002 | Okamoto et al. ......... 313/506 |
| 2002/0180767 | A1 * | 12/2002 | Northway et al. ........ 345/698 |

FOREIGN PATENT DOCUMENTS

| JP | 5-298257 | 11/1993 |
| JP | 8-152968 | 6/1996 |
| JP | 10-255976 | 9/1998 |
| JP | 2000-39856 | 2/2000 |
| JP | 2000-100558 | 4/2000 |
| JP | 2000-100560 | 4/2000 |
| JP | 2000-100660 | * 4/2000 |
| JP | 2001-175191 | 6/2001 |
| JP | 2001-292207 | 10/2001 |

(Continued)

OTHER PUBLICATIONS

K.H. Lee et al.; "9.3:2.2" QCIF Full Color Transparent AMOLED Display; *SID 03 Digest*; pp. 104-107; 2003.

(Continued)

*Primary Examiner*—Mariceli Santiago
(74) *Attorney, Agent, or Firm*—Fish & Richardson P.C.

(57) ABSTRACT

A dual light emission panel (panel capable of displaying images on both screens) is mounted in a display device or a portable information terminal to achieve a module with a small volume. The display device of the invention comprises a display screen, a first housing and a second housing that are connected to each other, and a dual light emission panel including display screens each on the front side and the back side. The dual light emission panel is connected to the first housing, disposed between the first housing and the second housing when overlapping the first housing, and rotated around a connecting point of the dual light emission panel and the first housing.

22 Claims, 7 Drawing Sheets

FOREIGN PATENT DOCUMENTS

| | | |
|---|---|---|
| JP | 2001-332392 | 11/2001 |
| JP | 2001-356714 | 12/2001 |
| JP | 2002-372929 | 12/2002 |
| JP | 2002372929 A * | 12/2002 |
| JP | 3408154 | 5/2003 |
| JP | 2003-345271 | 12/2003 |

OTHER PUBLICATIONS

Exhibition of Active Matrix Type Organic EL Display at "13th Flat Panel Display Manufacturing Technology Expo & Conference" by ELDis Group (*in Japanese with full translation*); Jul. 2, 2003.

Documents distributed in the "13th Flat Panel Display Manufacturing Technology Expo & Conference" by ELDis Group (5 pages).

"Two-way display developed"; *The Japan Times*; (1 page); Jul. 3, 2003.

"Mass Production of Organic EL Devices"; *Shimotsuke Newspaper* (*in Japanese with full translation*) ; Jul. 3, 2003.

PCT Internationaal Search Report (Application No. PCT/JP03/16032), Mar. 2, 2004 (in Japanese), 5 pages.

International Preliminary Examination Report (Application No. PCT/JP03/16032), Mar. 30, 2004, (Partial Translation), 3 pages.

\* cited by examiner

ELECTRONIC DEVICE PROVIDED WITH MULTIPLE DISPLAY PANELS INCLUDING AT LEAST ONE DUAL ELECTROLUMINESCENT LIGHT EMISSION PANEL

TECHNICAL FIELD

The present invention relates to a display device having a light emitting element, and more particularly relates to a portable information terminal such as a mobile phone and a PDA (Personal Digital Assistant).

BACKGROUND ART

In recent years, as a light emitting device, a display device using a self-light emitting element typified by an electroluminescence (EL) element and the like has been studied and developed instead of a liquid crystal display (LCD) using a liquid crystal element for a pixel. Such a light emitting device has the advantages of high image quality and wide viewing angle because of a light emitting type, and reduced thickness and weight and the like without need of a back light. Thus, the light emitting device is expected to be widely used for a display screen of a mobile phone and a display device.

As for a portable information terminal, a high added value is required with diversification of uses. Recently, a display can be used not only for displaying calls and e-mails but also for displaying landscapes, persons and the like with camera function and browsing Web pages. Further, applications have been enriched. In the future, a portable information terminal having a function to display images of a film, television and the like is expected to be widely used.

DISCLOSURE OF THE INVENTION (Problems to be Solved by the Invention)

As described above, a display of a display device, particularly that of a portable information terminal has become to display more amount of information. However, an existing display has a small screen which is seen with difficulty, therefore, impressive images are not displayed easily. Thus, a display device and a portable information terminal each provided with a larger display are needed. On the other hand, the display device and the portable information terminal are required to be reduced in weight, thickness and size, which trades off between a high added value.

In view of the foregoing problems, it is an object of the invention to provide a display device and a portable information terminal each including a dual light emission panel (a panel capable of displaying on both screens) and being capable of realizing a module with a small volume.

(Means for Solving the Problems)

In order to solve the aforementioned problems, the invention will take the following measures.

According to the invention, a display device comprises a first display screen, a first housing and a second housing that are connected to each other, and a dual light emission panel (hereinafter referred to as a dual display panel) that includes a second display screen on the front side and a third display screen on the back side. The dual display panel is connected to the first housing, disposed between the first housing and the second housing when overlapping the first housing, and rotated around a connecting point of the dual display panel and the first housing. As a result, both a display state using the second display screen and a display state using the first display screen and the third display screen become possible.

When the display device is folded at a connecting point of the first housing and the second housing, the first housing and the second housing can overlap with the dual display panel interposed therebetween.

According to the invention, a display device comprises a display screen including a plurality of pixels arranged in matrix. The display device comprises a plurality of panels at least one of which is a dual display panel including a display screen each on the front side and the back side.

The display device of the invention comprises a second display screen as a display screen on one side of the front side and the back side of the dual display panel, a third display screen as a display screen on the other side, and a first display screen as a display screen other than the second display screen and the third display screen. The display device has a first display state in which the second display screen is used, and a second display state in which the first display screen and the third display screen are used.

According to the display device of the invention, in the second display state, one image may be divided into two images one of which is a first image and the other is a second image, and the first image may be displayed on one of the first display screen and the third display screen and the second image may be displayed on the other screen.

According to the display device of the invention, in the second display state, the first display screen and the third display screen can display different images.

According to the invention, the display device can be applied to a portable information terminal.

According to the invention, the dual display panel may use an EL element as a display element.

According to the invention, the display device may be a foldable type.

The dual display panel can constitute a display device having a flat surface or a curved surface.

(Effect of the Invention)

According to the invention, a display with a larger screen can be mounted in a display device and a portable information terminal that have been limited in screen size. In addition, since dual display is achieved by using a dual display panel, a display device itself can be formed thinner than that using two single display panels. Therefore, a higher added value of a display device and a portable information terminal can be realized while reducing the weight, thickness and size thereof.

BEST MODE FOR CARRYING OUT THE INVENTION

Although the invention will be described by way of Embodiment Modes and Embodiments with reference to the accompanying drawings, it is to be understood that various changes and modifications will be apparent to those skilled in the art. Therefore, unless such changes and modifications depart from the scope of the invention, they should be constructed as being included therein.

Embodiment Mode 1

Figure 1:
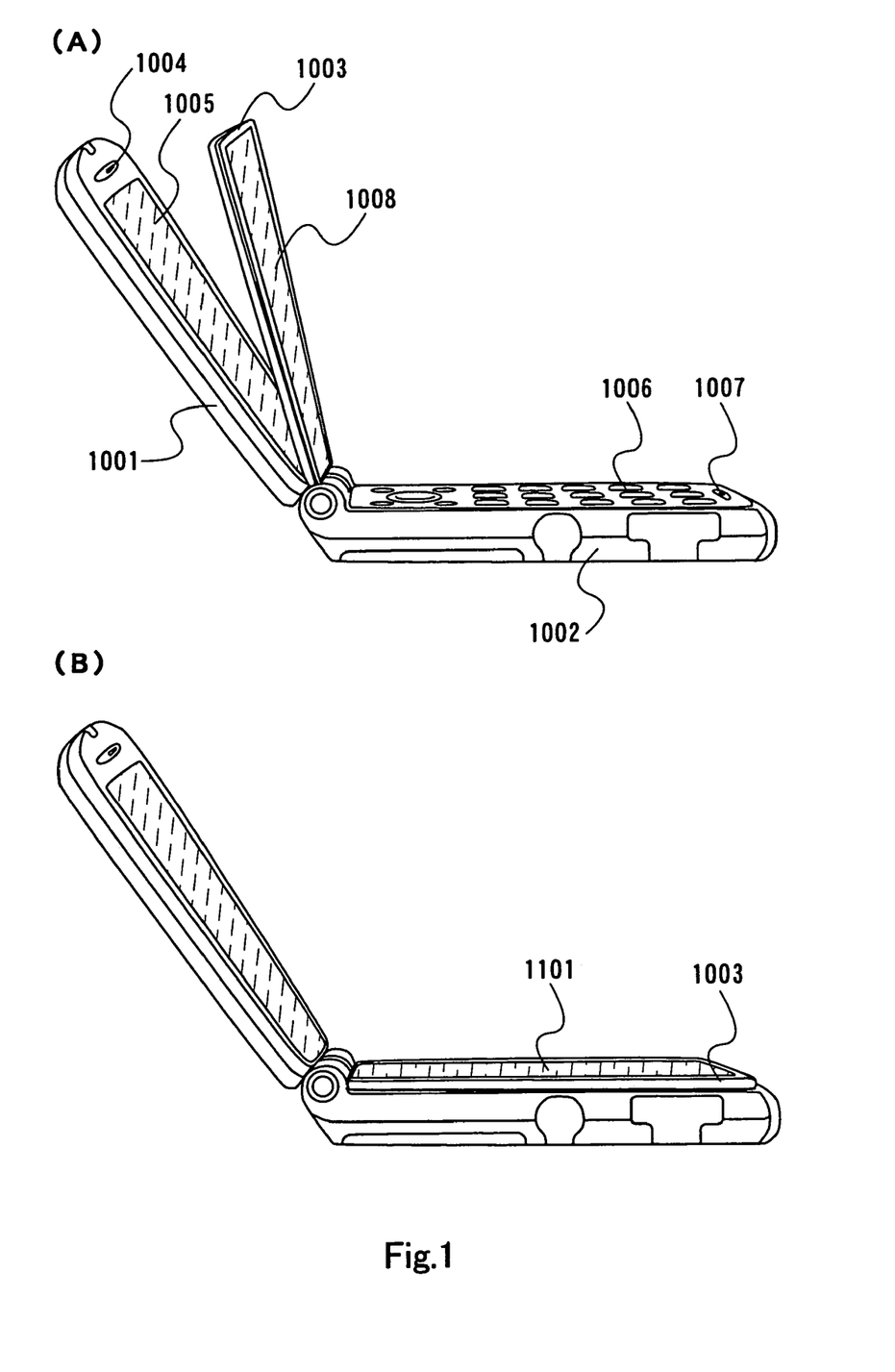
FIG. 1 shows an embodiment mode of the invention.

FIG. 1 shows an example of a flip phone including a dual display panel 1003.

The flip phone comprises a first housing 1001, a second housing 1002 and a dual display panel 1003. The first housing 1001 includes an audio output portion 1004, a first display screen 1005 and the like, and the second housing 1002 includes an operating button 1006, an audio input portion 1007 and the like. The dual display panel 1003 includes a second display screen 1008, a third display screen 1101 and the like.

According to the invention, the dual display panel 1003 is disposed between the first housing 1001 and the second housing 1002 of the mobile phone. When the dual display panel 1003 overlaps the first housing 1001, the second display screen 1008 of the dual display panel 1003, namely, only a single display screen is used. When the dual display panel 1003 overlaps the second housing 1002, the third display screen 1101 of the dual display panel 1003 and the first display screen 1005, namely, two display screens can be used.

Figure 2:
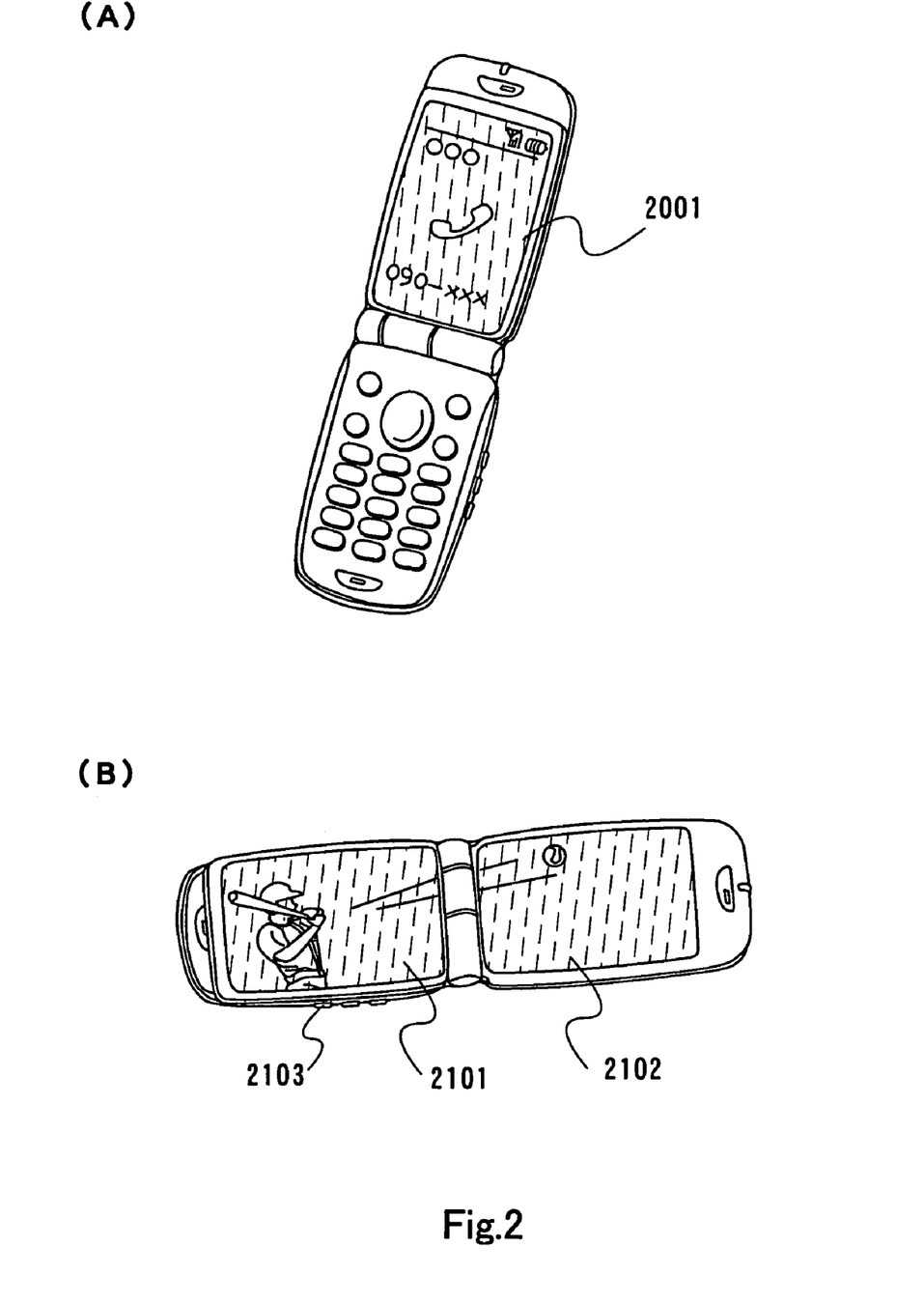
FIG. 2 shows an embodiment mode of the invention.

FIG. 2A shows an example of a first display state in which images are displayed on a single screen. A second display screen 2001 is used for displaying a relatively small amount of information such as calls and e-mails or displaying in a low power consumption mode.

FIG. 2B shows an example of a second display state in which images are displayed on two screens. The second display state in which images are displayed on a third display screen 2101 and a first display screen 2102 is used for displaying a film or television on a larger screen or magnifying and displaying images of the second display screen 2001. That is, one image is divided into two images one of which is displayed on the third display screen 2101 and the other of which is displayed on the first display screen 2102. Operations of the screens in the second display state may be carried out with a side operating button 2103, or with the third display screen 2101 or the first display screen 2102 that is made to be used as a touch panel.

In the second display state, different images may be displayed on the third display screen 2101 and the first display screen 2102. For example, an image of a person called is displayed on one screen while a Web page, an address book and the like are displayed on the other screen, or an image of a person called is displayed on one screen while the user's own image is displayed on the other screen. In the case of a plurality of persons being called, images of the persons called may be displayed separately.

Figure 5:
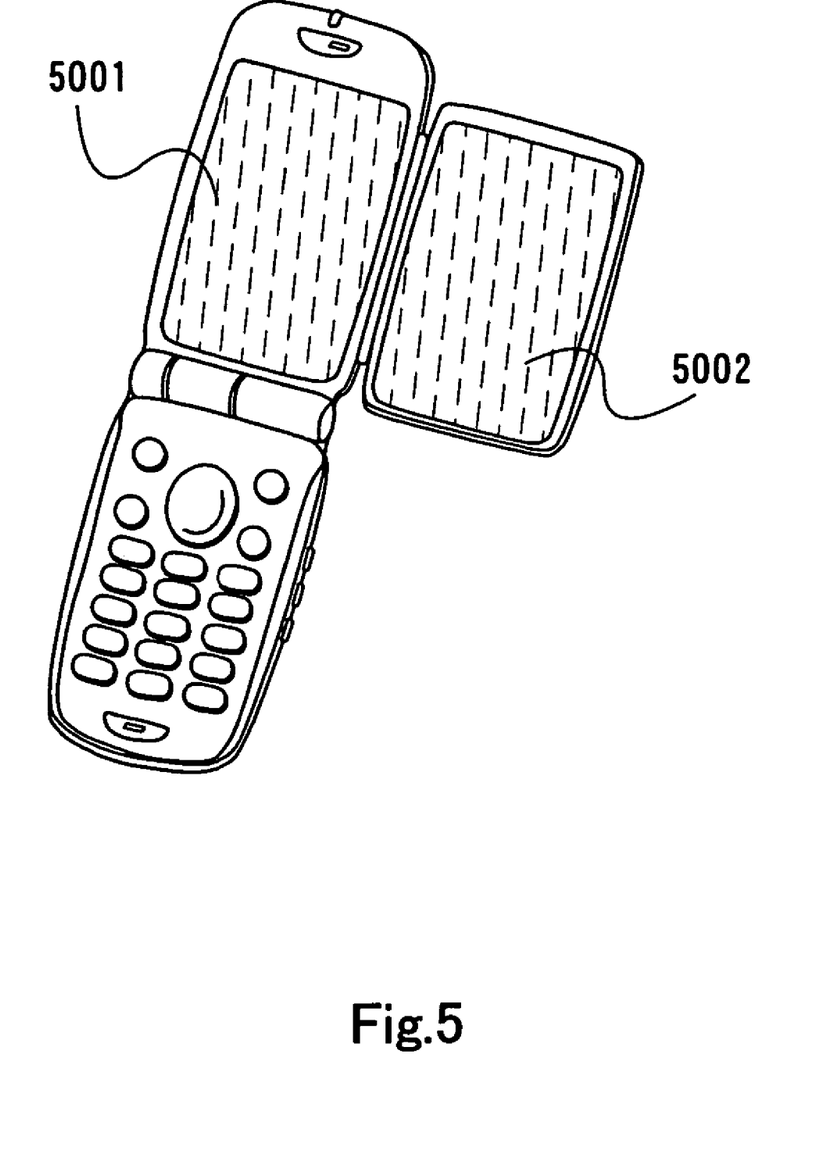
FIG. 5 shows an embodiment mode of the invention.

FIG. 5 shows an example in which a dual display panel is rotated around the right side of a first display screen 5001 of a mobile phone, and images are displayed on two screens of the first display screen 5001 and a third display screen 5002. In such a manner, a connecting point of the first display screen and the dual display panel 1003 of a mobile phone may be arranged anywhere around the first housing.

Although a dual display panel is used for a mobile phone in this embodiment mode, it may be used for a portable information terminal such as a PDA and a laptop personal computer. Further, the dual display panel may be formed of plastic or glass. Alternatively, it may be a foldable film panel. According to this, the dual display panel has a curved surface as well as a flat surface.

Described is the case in which one dual light emission panel is provided, though a plurality of dual light emission panels may be disposed between the first housing and the second housing.

Embodiment Mode 2

In Embodiment Mode 2, a dual light emission panel having a first display screen and a second display screen is described. Note that in this specification, a pixel electrode or a counter electrode using a light transmitting material means a transparent conductive film such as ITO or a film using aluminum and the like formed with a thickness that allows light to transmit through it, and a reflective material means a conductive material using aluminum and the like, which reflects light.

Figure 6:
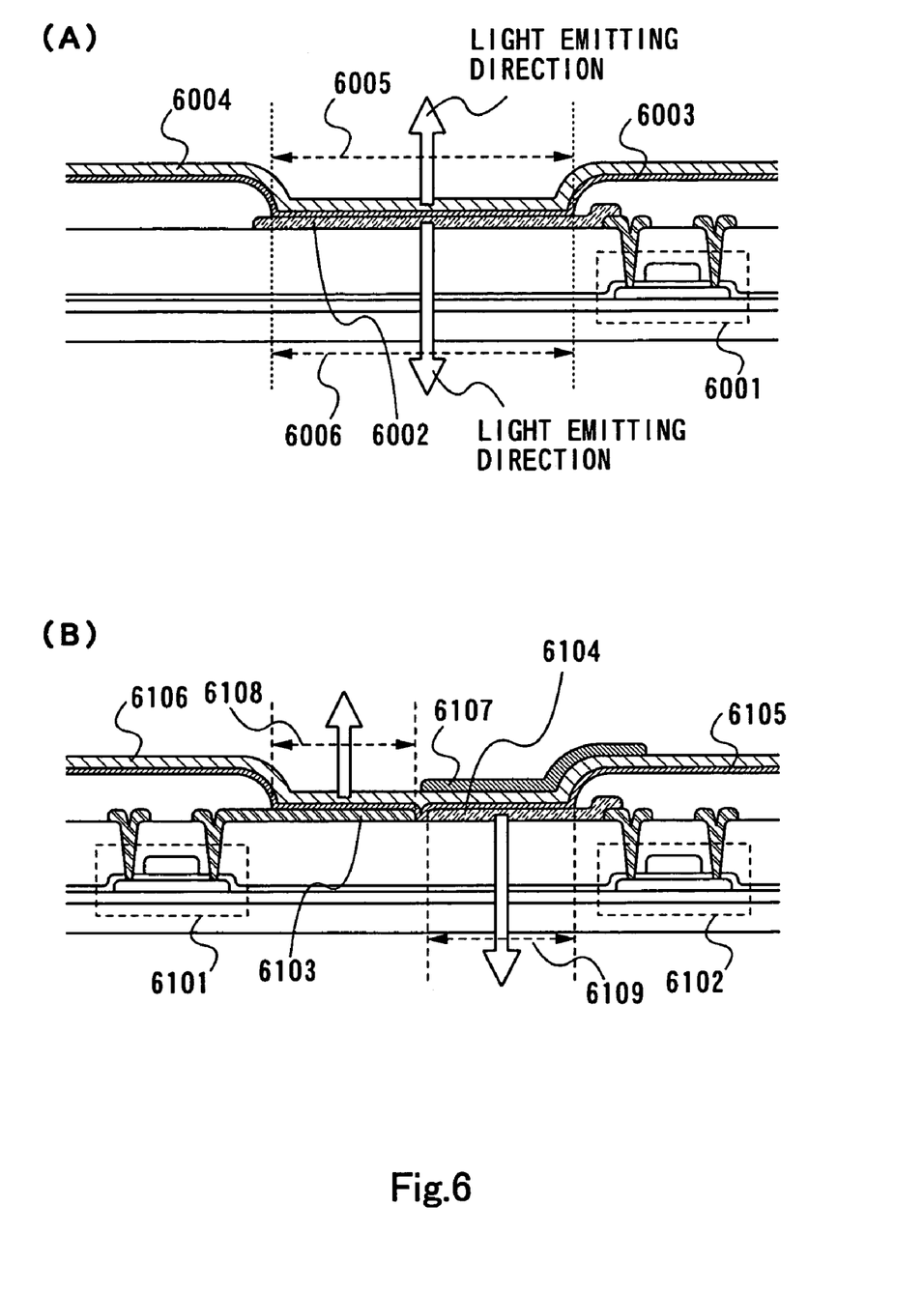
FIG. 6 shows an embodiment mode of the invention.

FIG. 6A comprises a driving TFT 6001, a pixel electrode 6002 using a light transmitting material, an EL layer 6003, a counter electrode 6004 using a light transmitting material, a first display area 6005, a second display area 6006 and the like.

A current flows between the pixel electrode 6002 connected to the driving TFT 6001 and the counter electrode 6004, and thereby the EL layer 6003 in the first display area 6005 emits light. At this time, since the pixel electrode 6002 and the counter electrode 6004 use a light transmitting material, light from the EL layer 6003 is emitted in both directions of the counter electrode 6004 and the pixel electrode 6002.

FIG. 6B comprises a first driving TFT 6101, a second driving TFT 6102, a first pixel electrode 6103 using a reflective material, a second pixel electrode 6104 using a light transmitting material, an EL layer 6105, a counter electrode 6106 using a light transmitting material, a reflective film 6107 using a reflective material, a first display area 6108, a second display area 6109 and the like.

A current flows between the first pixel electrode 6103 connected to the first driving TFT 6101 and the counter electrode 6106, and thereby the EL layer 6105 in the first display area 6108 emits light. At this time, since the first pixel electrode 6103 reflects light and the counter electrode 6106 transmits light, light from the EL layer 6105 is emitted in the direction of the counter electrode 6106.

Furthermore, a current flows between the second pixel electrode 6104 connected to the second driving TFT 6102 and the counter electrode 6106, and thereby the EL layer 6105 in the second display area 6109 emits light. At this time, since the reflective film 6107 reflects light and the second pixel electrode 6104 transmits light, light from the EL layer 6105 is emitted in the direction of the pixel electrode 6104.

The emission color of the EL layer may be either mono-color or RGB full color, and a color filter may also be combined therewith. The full color emission may be achieved by a white EL layer with color filters.

Specifically, the EL layer 6105 is formed of an organic compound or a charge injection transporting substance that contains an inorganic compound, and a light emitting material. The EL layer 6105 includes a layer of one or plural kinds selected from the group consisting of a low molecular weight organic compound, a medium molecular weight organic compound (that does not have subliming property and that has a molecularity of 20 or less, or a length of chained molecules of 10 μm or less), and a high molecular weight organic compound, which are relative to molecularity. The EL layer 6105 may include a layer that is formed of the organic compound combined with an inorganic compound with electron injection transporting property or hole injection transporting property. The charge injection transporting substance as an inorganic compound material includes diamond-like carbon (DLC), Si, Ge, and oxide or nitride of these substances, and may be appropriately doped with P, B, N or the like. Further, the charge injection transporting substance may include an oxide, a nitride, or a fluoride of alkali metal or alkali earth metal, and a compound or an alloy of the metal and Zn, Sn, V, Ru, Sm, or In.

A low molecular weight organic light emitting material as a preferable material forming the EL layer 6105 includes $Alq_3$, $BAlq_2$, $Almq_3$, DPVBi, PVK, a triphenylamine derivative (TPD), and the like. These materials are used as host materials, and quinacridone or the like is added as a dopant.

On the other hand, a high molecular weight organic light emitting material is physically stronger than a low molecular weight material and superior in durability of the element. Furthermore, a high molecular weight material can be formed by an application method and therefore manufacture of the element is relatively easy. The structure of a light emitting element using a high molecular weight organic light emitting material is basically the same as that of a light emitting element using a low molecular weight organic light emitting material, and has a cathode/an organic light emitting layer/an anode.

When the EL layer 6105 is formed from a high molecular weight organic light emitting material, a two-layer structure is employed in many cases. This is because it is difficult to form a laminated structure using a high molecular weight material unlike the case of using a low molecular weight organic light emitting material. Specifically, the EL layer using a high molecular weight organic light emitting material has a cathode/a light emitting layer/a hole transporting layer/an anode. The emission color is determined by the material of its light emitting layer. Therefore, a light emitting element that emits light of desired color can be formed by selecting an appropriate material of the light emitting layer. The high molecular weight electro luminescent material that can be used to form a light emitting layer is a polyparaphenylene vinylene-based material, a polyparaphenylene-based material, a polythiophen-based material, or a polyfluorene-based material.

The polyparaphenylene vinylene-based material is a derivative of poly (paraphenylene vinylene) [PPV], for example, poly (2,5-dialkoxy-1,4-phenylene vinylene) [RO-PPV], poly (2-(2'-ethyl-hexoxy)-5-metoxy-1,4-phenylene vinylene) [MEH-PPV], poly (2-(dialkoxyphenyl)-1,4-phenylene vinylene) [ROPh-PPV], and the like. The polyparaphenylene-based material is a derivative of polyparaphenylene [PPP], for example, poly (2,5-dialkoxy-1,4-phenylene) [RO-PPP], poly (2,5-dihexoxy-1,4-phenylene), and the like. The polythiophene-based material is a derivative of polythiophene [PT], for example, poly (3-alkylthiophene) [PAT], poly (3-hexylthiophene) [PHT], poly (3-cyclohexylthiophene) [PCHT], poly (3-cyclohexyl-4-methilthiophene) [PCHMT], poly (3,4-dicyclohexylthiophene) [PDCHT], poly [3-(4-octylphenyl)-thiophene][POPT], poly [3-(4-octylphenyl)-2,2bithiophene] [PTOPT], and the like. The polyfluorene-based material is a derivative of polyfluorene [PF], for example, poly (9,9-dialkylfluorene) [PDAF], poly (9,9-dioctylfluorene) [PDOF], and the like.

The aforementioned materials are just examples. A light emitting element can be formed by arbitrarily laminating functional layers using these materials, such as a hole injection transporting layer, a hole transporting layer, an electron injection transporting layer, an electron transporting layer, a light emitting layer, an electron blocking layer, and a hole blocking layer. Further, a mixed layer or a mixed junction may be formed by combining these layers.

In order to form an EL layer that emits white light, for instance, $Alq_3$, $Alq_3$ partially doped with Nile red that is a red light emitting pigment, $Alq_3$, p-EtTAZ, and TPD (aromatic diamine) are layered in this order by a vapor deposition method to obtain white light. When the EL layer is formed by application using spin coating, the layer after application is preferably baked by vacuum heating. For example, an aqueous solution of poly (ethylene dioxythiophene)/poly (styrene sulfonic acid) (PEDOT/PSS) is applied to the entire surface and baked to form a film that functions as a hole injection layer. Then, a polyvinyl carbazole (PVK) solution doped with a luminescence center pigment (such as 1,1,4,4-tetraphenyl-1,3-butadiene (TPB), 4-dicyanomethylene-2-methyl-6-(p-dimethylamino-styryl)-4H-pyran (DCM1), Nile red, or coumarin 6) is applied to the entire surface and baked to form a film that functions as a light emitting layer.

The EL layer 6105 may be formed of a single layer. For instance, 1,3,4-oxadiazole derivative (PBD) capable of transporting electrons is dispersed in polyvinyl carbazole (PVK) capable of transporting holes. Another method to obtain white light emission is to disperse 30 wt % of PBD as an electron transporting agent and disperse four kinds of pigments (TPB, coumarin 6, DCM1, and Nile red) in appropriate amounts. Other than the light emitting element shown here that provides white light emission, by selecting materials of the EL layer 6105 arbitrarily, a light emitting element that provides red light emission, green light emission or blue light emission can be manufactured.

For the EL layer 6105, a triplet exciton material containing a metal complex or the like may be used as well as the singlet exciton light emitting material described above.

EMBODIMENT

Embodiments of the invention will be described hereinafter.

Embodiment 1

Figure 3:
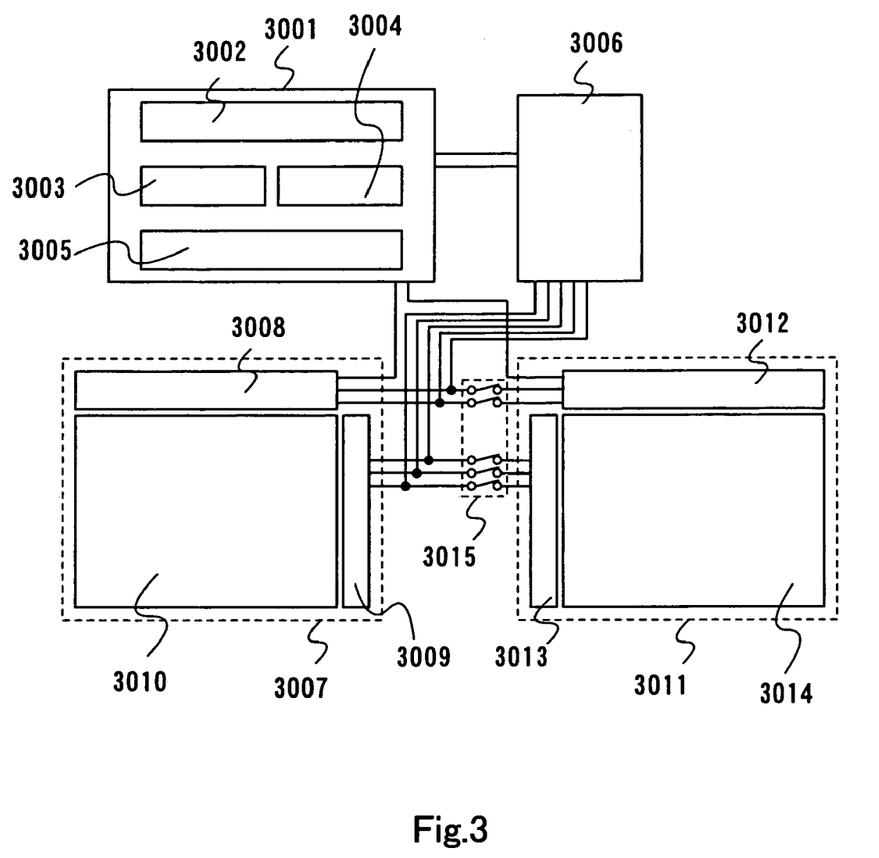
FIG. 3 shows a configuration example of a display module of the invention.

An example of a display module portion of the invention is explained with reference to FIG. 3.

A signal control circuit 3001 comprises a CPU 3002, a memory A 3003, a memory B 3004, a memory controller 3005 and the like. A dual display panel 3007 comprises a first source signal line driver circuit 3008, a first gate signal line driver circuit 3009, a first display screen 3010, a second display screen that is on the back side of the first display screen, and the like. A display panel 3011 comprises a second source signal line driver circuit 3012, a second gate signal line driver circuit 3013, a third display screen 3014 and the like.

In a first display state, a switch 3015 is turned off. A signal and a driving voltage for operating the dual display panel 3007 are inputted from a display controller 3006 to the first source signal line driver circuit 3008, the first gate signal line driver circuit 3009 and the like. Since the switch 3015 is off at this time, the display panel 3011 does not operate.

An image signal inputted to the signal control circuit 3001 is controlled by the memory controller 3005 to be inputted to the memory A 3003 or the memory B 3004 and stored therein. Then, the dual display panel 3007 is selected by the memory controller 3005, and the image signal that is sequentially read out from the memory A 3003 or the memory B 3004 is inputted to the first source signal line driver circuit 3008.

In a second display state, the switch 3015 is turned on. Since the switch 3015 is on, a signal and a driving voltage for operating the dual display panel 3007 and the display panel 3011 are inputted to the first source signal line driver circuit 3008, the first gate signal line driver circuit 3009, the second source signal line driver circuit 3012, the second gate signal line driver circuit 3013 and the like.

In the case of, in the second display state, one image being divided into two images, and either of them being displayed on the dual display panel 3007 while the other being displayed on the display panel 3011, an image signal is converted by the memory controller 3005 in accordance with the number of pixels and a display mode, and divided into left and right parts to be inputted to the dual display panel 3007 and the display panel 3008, respectively.

In the case of, in the second display state, different images being displayed on the dual display panel 3007 and the display panel 3011, a first image signal and a second image signal that have been inputted to the signal line control circuit 3001 are inputted to the memory A 3003 and the memory B 3004, respectively, and stored therein. Then, the first image signal is sequentially read out by the memory controller 3005 and inputted to the first source signal line driver circuit 3008, and the second image signal is inputted to the second source signal line driver circuit 3012.

The configurations of the driver circuits in the dual display panel 3007 and the display panel 3011 are not limited to the general ones shown in this embodiment. In particular, the dual display panel 3007 may adopt a driver circuit configuration capable of being switched vertically to horizontally. Image signals stored in the memory A 3003 and the memory B 3004 may be rearranged by the memory 3005 depending on the display direction and displayed on the dual display panel 3007. Also, the source signal line driver circuit and the gate signal line driver circuit may adopt a configuration capable of switching the scan direction in order to change vertically and horizontally or upwards and downwards depending on the display direction.

Although a configuration example of an active matrix type dual display panel is shown herein, a passive matrix type dual display panel may be adopted as well.

Embodiment 2

Figure 7:
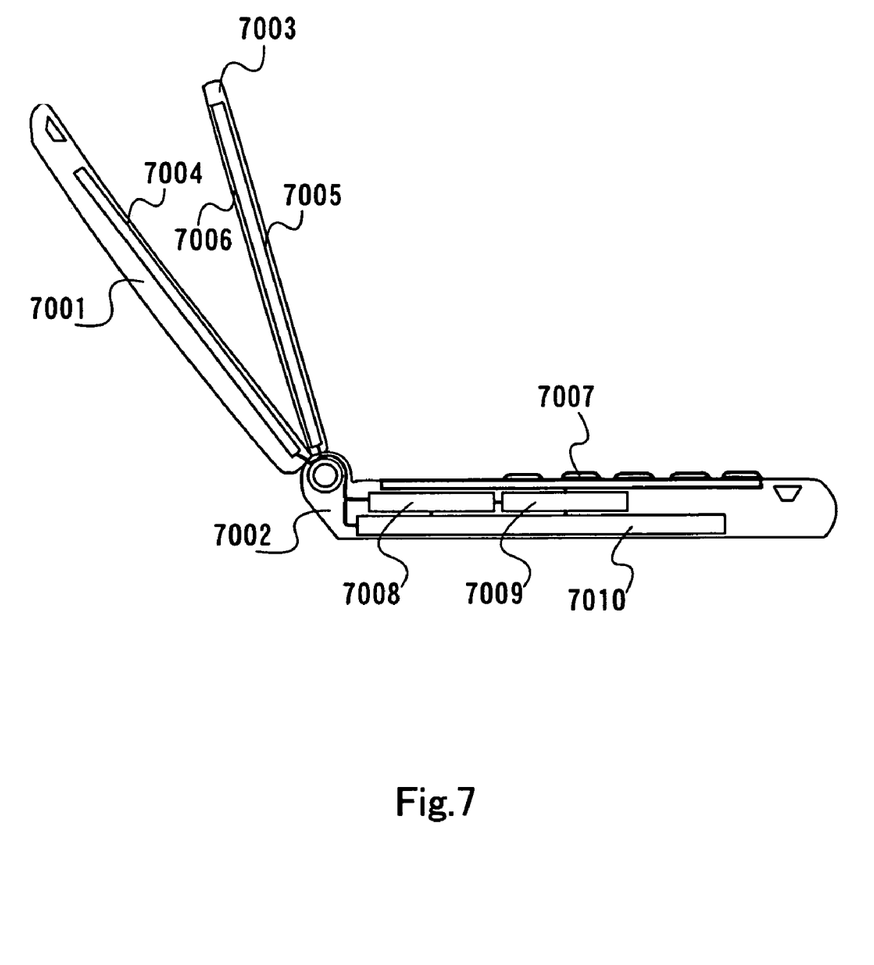
FIG. 7 shows an example of a cross sectional view of the display device of the invention.

FIG. 7 shows an example of a cross sectional view of the display module explained in Embodiment 1.

The display module in FIG. 7 comprises a first housing 7001, a second housing 7002 and a dual display panel 7003. The first housing 7001 includes a first display portion 7004 and the like, the second housing 7002 includes an operating button 7007, a display controller 7008, a signal control portion 7009, a battery portion 7010 and the like, and the dual display panel 7003 includes a second display screen 7005, a third display screen 7006 and the like. The connection and operation of each part are similar to those shown in Embodiment 1.

Embodiment 3

Described herein is an example of the display device of the invention applied to a laptop personal computer, a PDA and an electronic book. Since one dual display panel can display images in both directions, the thickness of a housing of a display device can be reduced even in the case of, as shown in FIGS. 4A, 4B and 4C, display screens being provided on both sides of a panel.

Figure 4:
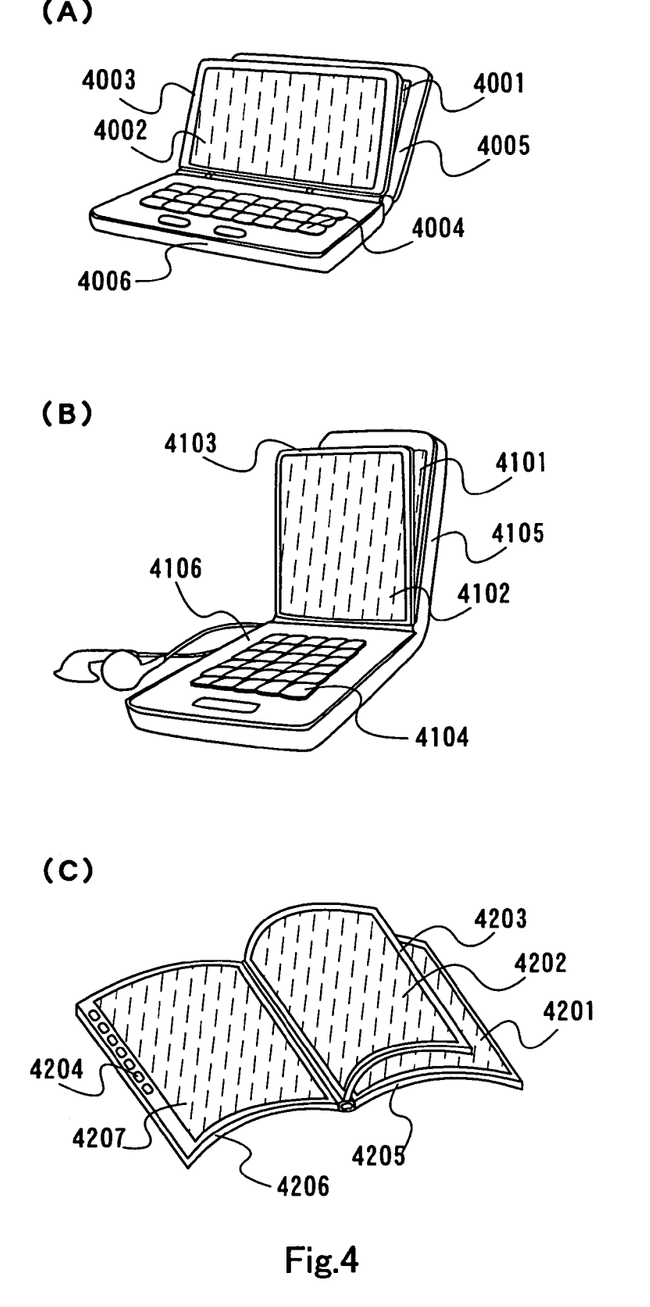
FIG. 4 shows electronic appliances using the display device of the invention.

FIG. 4A shows an example of a laptop personal computer mounting a dual display panel 4003. A first housing 4005 includes a first display screen 4001, a second housing 4006 includes an operating button 4004 and the like, and the dual display panel 4003 includes a second display screen 4002 on the front side and a third display screen on the back side of the second display screen 4002. The dual display panel 4003 is disposed between the first housing 4005 and the second housing 4006.

In a normal use, only one screen is used for displaying images. At this time, the dual display panel 4003 overlaps the first housing, and the second display screen is used. When a large screen is needed, the dual display panel overlaps the second housing and images are displayed on two screens.

FIG. 4B shows an example of a PDA mounting a dual display panel 4103. A first housing 4105 includes a first display screen 4101, a second housing 4106 includes an operating button 4104 and the like, and the dual display panel 4103 includes a second display screen 4102 on the front side and a third display screen on the back side of the second display screen 4102. The dual display panel 4103 is disposed between the first housing 4105 and the second housing 4106.

In a normal use, only one screen is used for displaying images. At this time, the dual display panel 4103 overlaps the first housing, and the second display screen is used. When a large screen is needed, the dual display panel overlaps the second housing and images are displayed on two screens.

FIG. 4C shows an example of an electronic book mounting a dual display panel 4203. A first housing 4205 includes a first display screen 4201, a second housing 4206 includes an operating button 4204 and a fourth display screen 4207, and the dual display panel 4203 includes a second display screen 4202 on the front side and a third display screen on the back side. The dual display panel 4203 is disposed between the first housing and the second housing.

As an example of use of the electronic book including the dual display panel 4203, it is usable to read texts on the first display screen 4201 and the third display screen while referring to drawings on the second display screen 4202 and the fourth display screen 4207. In this case, at the moment of the dual display panel 4203 started to be turned, the display of the dual display panel may be changed from the third display screen to the second display screen.

Furthermore, after reading from the first display screen to the third display screen, and when the next page, namely the dual display panel is started to be turned, the second display screen and the fourth display screen may display the next pages at a certain angle. Then, after using the second display screen and the fourth display screen, and when the dual display panel is started to be turned, the first display screen and the third display screen may display the next pages at a certain angle. According to this, switching of images cannot be recognized and optical discomfort and the like can be suppressed.

The invention claimed is:

1. A display device comprising:
   a plurality of display panels each comprising a plurality of pixels,
   wherein at least one of the plurality of display panels is a dual light emission panel comprising an EL element and having a first display screen on a front side of the dual light emission panel and a second display screen on a back side of the dual light emission panel.

2. The display device according to claim 1, wherein the display device is a portable information terminal.

3. The display device according to claim 2, wherein the portable information terminal is a foldable type.

4. An electronic appliance using the display device according to claim 1.

5. The display device according to any one of claims 1, wherein the display device is incorporated into at least one selected from the group consisting of a laptop computer, a PDA and an electronic book.

6. A display device according to claim 1, wherein the dual light emission panel comprises a TFT.

7. A display device according to claim 1, wherein the EL element comprises an electrode using a reflective material.

8. A display device comprising:
a plurality of display panels each comprising a plurality of pixels, and
a first housing and a second housing that are connected to each other;
wherein at least one of the plurality of display panels is a dual light emission panel comprising an EL element and having a first display screen on a front side of the dual light emission panel and a second display screen on a back side of the dual light emission panel, and
wherein the dual light emission panel is connected to the first housing and disposed between the first housing and the second housing.

9. The display device according to claim 8, wherein, when the display device is folded at a connecting point of the first housing and the second housing, the first housing and the second housing overlap with the dual light emission panel interposed therebetween.

10. The display device according to claim 8, further comprising:
a third display screen on one of the first housing and the second housing;
wherein the display device has a first display state in which the first display screen is used, and a second display state in which the second display screen and the third display screen are used.

11. The display device according to claim 8, wherein the display device is a portable information terminal.

12. The display device according to claim 11, wherein the portable information terminal is a foldable type.

13. An electronic appliance using the display device according to claim 8.

14. The display device according to claim 8, wherein the display device is incorporated into at least one selected from the group consisting of a laptop computer, a PDA and an electronic book.

15. A display device according to claim 8, wherein the dual light emission panel comprises a TFT.

16. A display device according to claim 8, wherein the EL element comprises an electrode using a reflective material.

17. A display device comprising:
a plurality of display panels each comprising a plurality of pixels,
wherein at least one of the plurality of display panels is a dual light emission panel comprising an EL element and having a first display screen on a front side of the dual light emission panel and a second display screen on a back side of the dual light emission panel, and
wherein the EL element comprises:
a pixel electrode using a light transmitting material;
a second electrode using a light transmitting material; and
an EL layer.

18. A display device according to claim 17, wherein the dual light emission panel comprises a TFT.

19. A display device according to claim 17, wherein the EL element further includes a reflective film that is overlapped with the pixel electrode and the second electrode.

20. A display device comprising:
a plurality of display panels each comprising a plurality of pixels, and
a first housing and a second housing that are connected to each other;
wherein at least one of the plurality of display panels is a dual light emission panel comprising an EL element and having a first display screen on a front side of the dual light emission panel and a second display screen on a back side of the dual light emission panel,
wherein the dual light emission panel is connected to the first housing and disposed between the first housing and the second housing, and
wherein the EL element comprises:
a pixel electrode using a light transmitting material;
a second electrode using a light transmitting material; and
an EL layer.

21. A display device according to claim 20, wherein the dual light emission panel comprises a TFT.

22. A display device according to claim 20, wherein the EL element further includes a reflective film that is overlapped with the pixel electrode and the second electrode.

* * * * *